ns Cited
U.S. PATENT DOCUMENTS
3,231,220  1/1966  Fischer .................................. 416/87

United States Patent [19]

Bailey

[11] 4,151,424
[45] Apr. 24, 1979

[54] APPARATUS FOR UTILIZATION OF ENERGY FROM FLUIDS

[76] Inventor: David Z. Bailey, 214 Bowen St., Providence, R.I. 02906

[21] Appl. No.: 770,120

[22] Filed: Feb. 18, 1977

[51] Int. Cl.² .............................................. F03B 13/05
[52] U.S. Cl. ...................................... 290/54; 416/111; 416/86; 290/43
[58] Field of Search ....................... 290/42, 43, 44, 53, 290/54, 55; 416/87, 111, 119, 85, 86

[56] References Cited

U.S. PATENT DOCUMENTS 3,231,220  1/1966  Fischer .................................. 416/87

FOREIGN PATENT DOCUMENTS 301091  11/1928  United Kingdom .................... 416/111

Primary Examiner—Robert K. Schaefer
Assistant Examiner—John W. Redman
Attorney, Agent, or Firm—Brooks, Haidt, Haffner & Delahunty

[57] ABSTRACT

Improved apparatus for withdrawing useful energy from a fluent medium, the apparatus comprising supports with tension members spanning the distance between them, foils distributed along the tension member spans, and circular members capable of rotating freely with the tension members, power being taken off the apparatus through fewer than all of the circular members.

24 Claims, 10 Drawing Figures

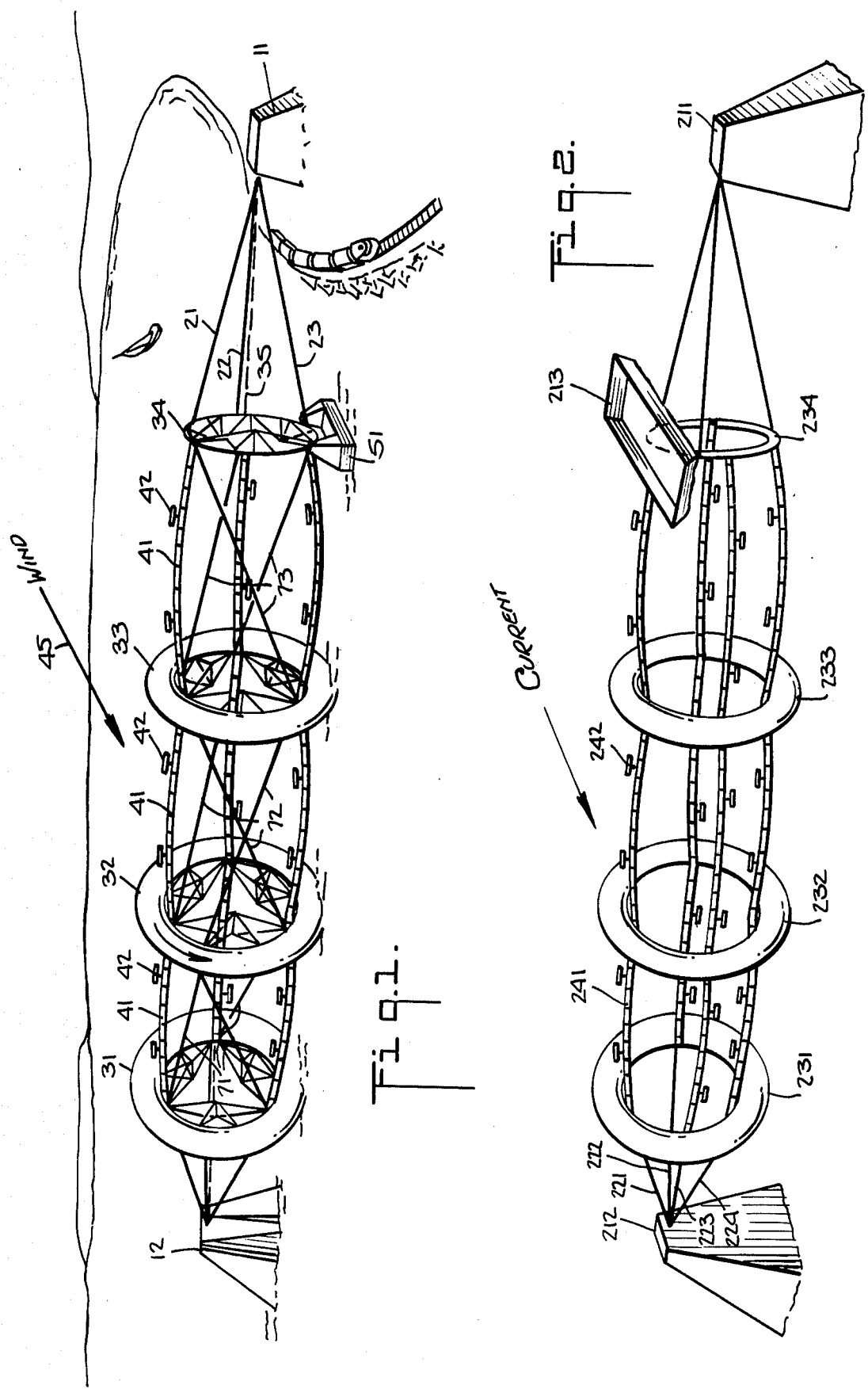

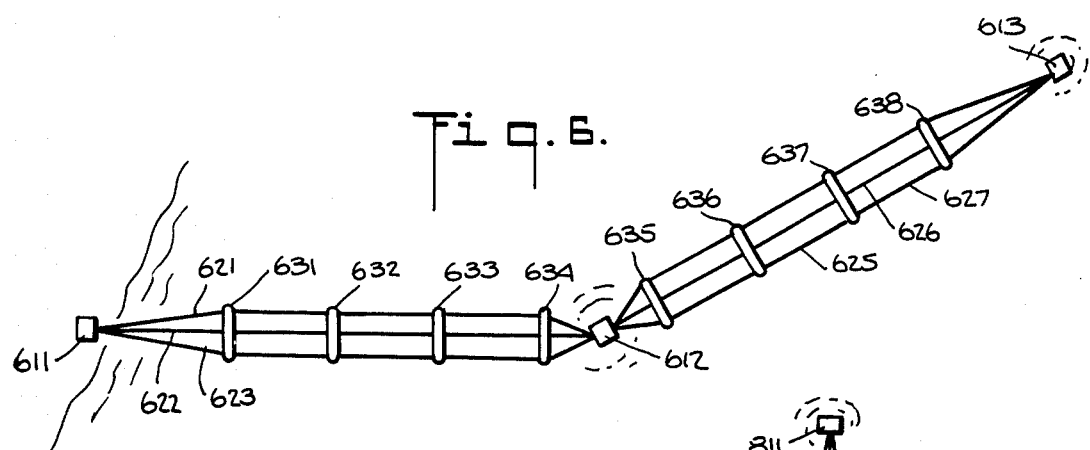
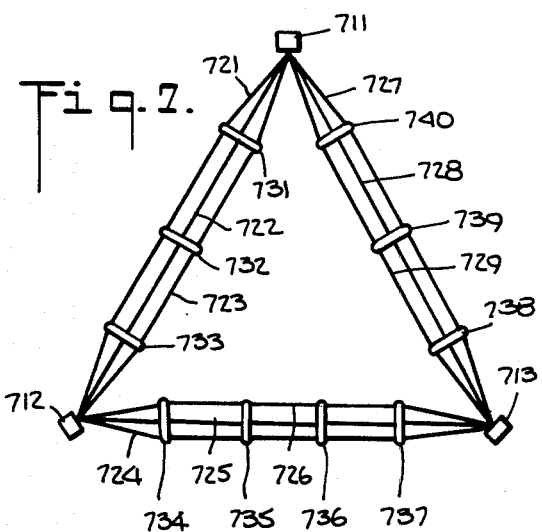
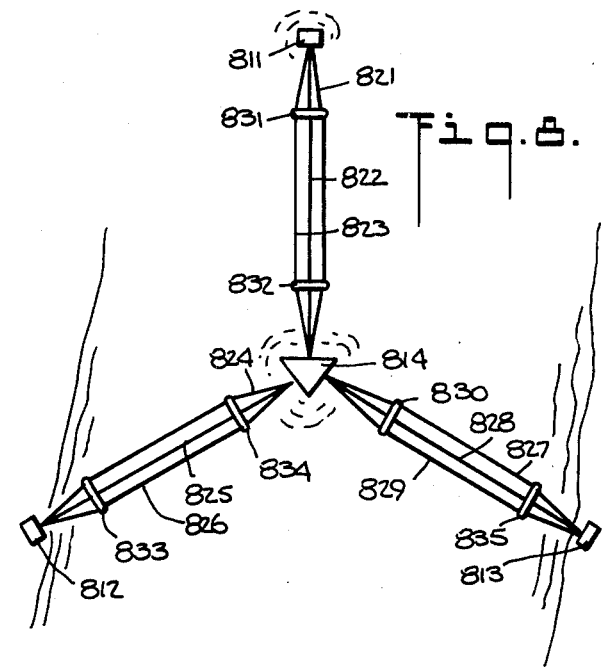
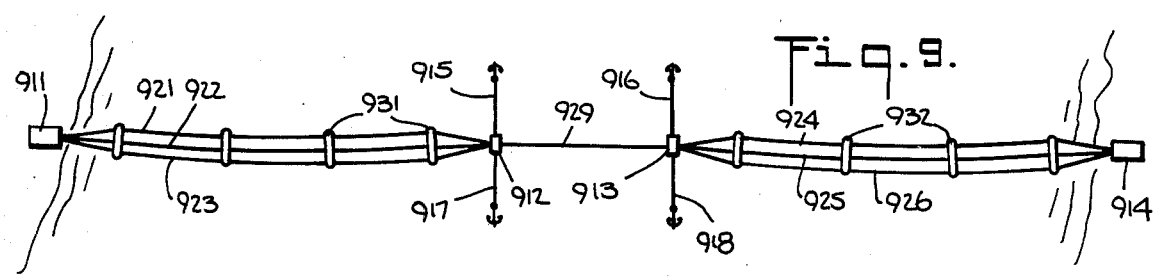
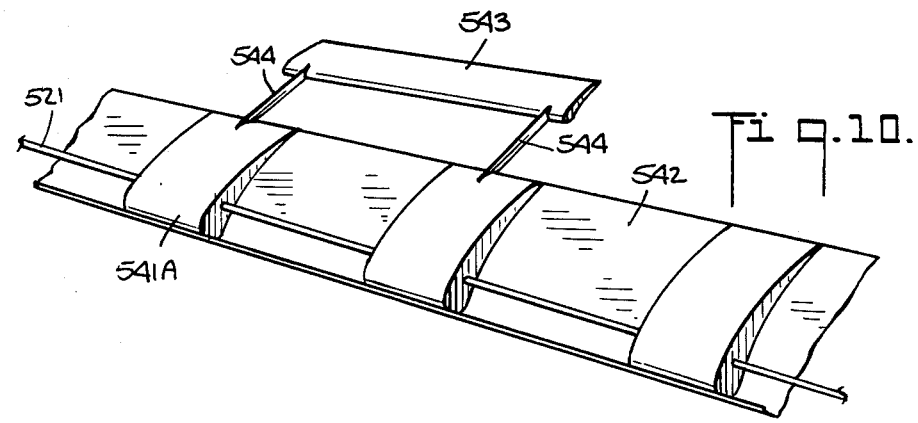

APPARATUS FOR UTILIZATION OF ENERGY FROM FLUIDS

BACKGROUND OF THE INVENTION

The present invention relates to devices for extracting useful energy from fluent media, and more particularly, it relates to improved apparatus embodying lift foil elements with economical power takeoff means.

As taught in Bailey, U.S. Pat. No. 3,978,345, various devices have been proposed for utilizing the energy contained in fluent media. Some of the more common fluent media containing kinetic energy are fresh water, sea water, and the planetary atmosphere. The kinetic energy in water is contained in currents, such as river currents, tidal currents, and the like; the energy of the atmosphere, in the movement commonly referred to as the wind.

The use of potential energy from moving streams of water, such as at falls or natural or artificial dams, has long been known and has been used historically for the operation of various mills and more recently for the generation of electrical power. The difficulty with such sources of potential energy is that the potential energy is available only at a relatively small number of sites, namely, at natural falls or at dams. Accordingly, such possible sources of energy cannot be utilized in many parts of the world, such as in deserts or at sea level.

Another hallmark of such classical systems for the utilization of potential energy in a liquid medium such as water is that the flow is required to be unidirectional, and it is ordinarily impracticable to use such devices where the flow is multidirectional. Such multidirectional flow occurs in tidal current schemes which have been proposed, but due to limitations of apparatus and the requirement for efficiency in use, even such schemes for harnessing tidal currents generally involve power generation only by unidirectional flow, that is, by permitting the water to flow inshore, trapping it in a basin, and then releasing it through an appropriate energy conversion device when the tidal level of the water is lower than the level of the water captured in the basin.

The power in the wind has in the past been chiefly used to drive devices rotating on a horizontal axis, such as propellers, windmills, and turbines. The use of various devices rotating on a vertical axis such as Darrieus machines and Savonius cylinders is also known.

Such machines can be effective, but they generally define a relatively small area in which the wind can act on them. Moreover, they generally take up valuable space on land, which space could be used for agricultural, residential, or industrial purposes.

The above-mentioned Bailey patent describes a vastly improved system for harnessing energy. The Bailey system can be used virtually anywhere that supports can be provided, and it is simple in construction, easy to maintain, and relatively efficient. It is well suited to the need for extracting kinetic energy over a large sectional area of a fluent medium, as is required with relatively diffuse media.

THE INVENTION

The present invention relates to apparatus for extracting energy from fluent media, with a great economy in the power takeoff equipment and in the maintenance and utilization thereof. Moreover, the apparatus according to this invention can be installed in or over water in places where space is available. Briefly, the present apparatus for withdrawing useful energy from a fluent medium comprises at least two spaced-apart supports with a number of tension members spanning the distance between the supports; lift-generating foils disposed on the tension members over at least a portion of the cable span; and circular members attached to tension members, at least one of the circular members rotating freely about the center of rotation of the tension members, and not being coupled directly to a power-takeoff means.

The invention will hereinafter be further described by reference to the accompanying drawings, wherein:

FIG. 1 is an overall generally isometric view of an embodiment of the invention in a gaseous fluent medium;

FIG. 2 is an overall generally isometric view of an embodiment of the invention in a liquid fluent medium;

FIG. 6 is a schematic representation of an aerodynamic embodiment using multiple units;

FIG. 7 is a schematic representation of an omnidirectional aerodynamic embodiment using a delta configuration;

FIG. 8 is a schematic representation of an omnidirectional embodiment using a wye configuration;

FIG. 9 is a schematic representation of a long span embodiment utilizing additional support means;

FIG. 10 is an isometric view of an airfoil construction according to a preferred embodiment of the invention.

Figure 3:
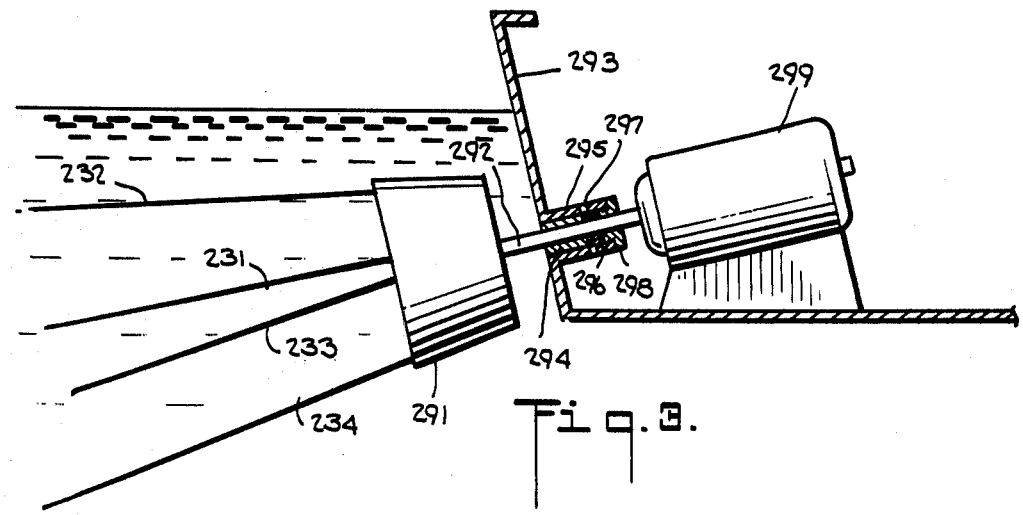
FIG. 3 is a view of an alternative power takeoff for the liquid fluent medium embodiment of FIG. 2.

It will be understood from the present description that the apparatus of this invention can be used with gaseous fluent media, such as air and other atmospheres; with liquid fluent media such as fresh, brackish and salt water flowing in streams, including both confined streams such as those in rivers, canals and the like and free streams such as the flow of water in the Gulf Stream; and with fluent streams comprising particulate matter containing kinetic energy which can be withdrawn from the stream.

One of the great advantages of the present invention is that, while the energy in relatively small streams can be utilized, the total span of the apparatus can be extremely large, on the order of many miles depending only upon the physical characteristics of the materials of construction used and the free volume available in the stream. Thus, apparatus according to the present invention can, through the selection of supports and circular members, be utilized over any given length. Moreover, if desired, the span at a support member can be altered in direction for the next span so as to take maximum advantage of generally prevailing winds, current flows, or the like.

In one aspect of the present invention, a large scale hydrodynamic system is contemplated to utilize tidal energy in a bay or estuary. In such embodiments the flow of fluid is unidirectional or reciprocally bidirectional. By bidirectional is meant the flow is, during some part of the operation, from a first direction and during another portion of the operation from a direction substantially diametrically opposed to the first direction. Unidirectional flow would be typified by the flow in a fresh water river, while reciprocally bidirectional flow would be typified by a tidal current flow which reverses from time to time depending upon the particular tidal pattern, e.g., diurnal, semidiurnal, and the like.

In another aspect of the present invention a large scale aerodynamic system is contemplated, and in this instance the direction flow of the fluent medium, the wind, can be more or less variable and can be omnidirectional, that is, the wind can blow from any direction. It will be recognized by those skilled in the art that the wind in certain parts of the world favors one or a few prevailing directions. In other areas, the wind can blow from any quarter.

Thus, it can be appreciated that not only can the foils be different, depending upon whether the embodiment is hydrodynamic or aerodynamic, but further there are different modes of disposing the apparatus, when it is aerodynamically driven or hydrodynamically driven. These various desirable embodiments will be hereinafter described in greater detail.

The use of lift foils for deriving energy from a moving fluid stream has already been shown in aforementioned U.S. Pat. No. 3,978,345 and the principles of controlling the angle of attack of the foils are disclosed there. FIGS. 4A, 6, and 7 especially of that Patent illustrate the factors involved in providing desired angles of attack and the means for maintaining good lift/drag ratios, so the details of the foil orientation will not herein be repeated.

Referring to FIG. 1, a large scale apparatus for extracting energy from wind forces is shown. The apparatus is anchored at its extreme ends by spaced-apart support members 11 and 12, which counter the tensile stresses in tension members 21, 22, and 23 which span the distance between the two supports. The tension members, which are conveniently cables or alternatively chains, linked rods, or other structures capable of bearing the tensile forces, are symmetrically led through rotating members 31, 32, 33, and 34.

The rotating members serve a number of requisite functions. Firstly, they maintain the angular relationship between the tension members. Secondly, they reduce the sag obtained at a given tension and maintain the spacing of tension members 21, 22, and 23 from the center of rotation 35 of the tension members and rotating or ring members 31, 32, 33, and 34.

The driving force which causes support members 31, 32, 33, and 34 and tension members 21, 22, and 23 to rotate is provided by the wind, the direction of which is indicated by vector 45 acting on ribbon foils 41. One of the important features of this system is that the foils are laterally subject purely to tensile loads and these loads are supported by tension members 21, 22, and 23, so that the structure of foils 41, the angles of attack of which are controlled by vanes 42, can be very light and hence economical of fabrication.

It will be appreciated by those skilled in the art that tension members 21, 22, and 23 and hence center of rotation 35 will not necessarily be straight lines when the apparatus is in operation. Rather, the tension members will generally define a catenary curve which sags in a direction away from the resultant forces acting upon the system.

It will be appreciated from the present disclosure that sag is the distance normal to a straight line defining the shortest distance between the attachment points of the tension member to a circular member, by which distance the tension member departs from the straight line. Some sag is induced by gravitational forces and the dynamic (drag) force of the fluent medium. However, since the foil members generate lift, the forces on a tension member during certain portions of its rotation about center of rotation 35 act upwardly and the sag of the tension member can be upward. Increasing the tension will of course reduce the sag, but it cannot be entirely eliminated and in the practical systems of the present invention the tensile forces in the tension members and their size and materials of construction are taken into consideration and balanced against the sag.

FIG. 9 shows one way of reducing the downstream sag in an apparatus according to the present invention. In this plan view of an aerodynamic embodiment, cables 921, 922, and 923 span the distance between support members 911 and 912 and tension members 924, 925, and 926 span the distance between support members 913 and 914. Cables 921, 922, and 923 pass through rotating members 931 and cables 924, 925, and 926 pass through rotating members 932.

Support members 911 and 914 are piers mounted on the opposite banks of the stream, while support members 912 and 913 are barges, respectively, moored by upstream (referred to the liquid stream current) rodes 915 and 916. Rodes 917 and 918 extend downstream, respectively, from barges 912 and 913 and are sufficiently slack that barges 912 and 913 are free to yaw and move laterally. In this manner the barges can move so that no substantially radial loads are placed upon the bearings of the support towers (not shown) on the barges. Rodes 917 and 918 are able to maintain the barges on station in the event that the net forces on barges 912 and 913 are upstream (as might occur with very heavy winds in an upstream direction) with regard to the fluid stream.

Linking tensile member 929 is shown to span the midchannel portion of the stream, and permit the passage of shipping up and down the stream. Some of the possible kinetic energy of the wind is then lost, but the power generation equipment does not interfere with waterborne commerce. In the embodiment contemplated in FIG. 9, the diameter of the circular members is 500 feet, so there would be over 200 feet of vertical clearance available under linking tensile member 929. The use of such a linking tensile member avoids the need for a heavy anchorage outboard of barges 912 and 913, minimizes interference with marine navigation, and permits the use of smaller barges than would be required if the barges were anchored laterally and would have to supply large buoyancy forces.

It is noted with respect to FIG. 9 that the foils carried on the cables are not shown because of the scale of the drawing. It should also be noted that power can be withdrawn from the system at any or all of supports 911, 912, 913 and 914. The energy from offshore barges 912 and 913 can be transferred to electrical generators or alternators and the power produced be conducted ashore by means of submerged electrical conductors. In the embodiment shown in FIG. 9, it is preferable to have the electrical generation capability at piers 911 and 914 to minimize the need for maintenance of the extra cables and rotating generating equipment.

In FIG. 1 rotating members 31, 32, and 33 are tores which have sufficient buoyancy to hold them well out of the water. Moreover, they also support cables 21, 22, and 23 bearing foils 41 so that the cables are clear of the water during their rotation about center of rotation 35. As noted above, the vertical forces on tension members 21, 22, and 23 fluctuate during rotation thereof about the center of rotation. The net vertical aerodynamic forces can be made to average out at zero, positive or negative, as desired, by angle-of-attack control.

In the FIG. 1 embodiment, rotating member 34 does not provide flotation, but rather is supported in bearings (not shown) on barge 51 which contains power takeoff means, such as teeth on its exterior surface which engage appropriate gears and drives to turn a generator (not shown). The power produced by the generator is brought ashore and fed into the power grid by conductor cables. The speed of rotating member 34 and hence of the gears and generator will vary depending upon the force of the wind. However, the voltage of the generator or the frequency of the alternator so coupled to rotating member 34 can be controlled using variable-speed constant-frequency (VSCF) or constant-speed constant-frequency (CSCF) techniques known to those skilled in the art.

The cross-section of tores 31, 32, and 33 viewed from a normal to their axes of rotation can be circular, elliptical, rectangular, or such other shape as is economically fabricated. They are of course circular as viewed axially.

It should also be noted that tension members 21, 22, and 23 need not pass through the tores, but in such case the walls of the tores must themselves be designed to bear the tension loads, and it is accordingly preferable that tension members 21, 22, and 23 themselves pass through the rotating members or alternatively that they be secured to rods extending through the tores to handle the axial tensile load. It is generally desirable that the tension members be equally radially distant from the center of rotation which in the case of the FIG. 1 embodiment requires the tension members to be attached to the outer circumference of rotating member 34 and the inner circumferences of tores 31, 32, and 33.

The apparatus of FIG. 1 can be modified by removing barge 51 and changing rotating member 34 to a tore which would provide flotation as do tores 31, 32, and 33. In this instance the power takeoff can be in one or both of supports 11 and 12. It is advantageous to have the power takeoff in shore-mounted pier 11 to simplify maintenance and facilitate transmission of the electrical power produced, as shown in FIG. 4.

Figure 4:
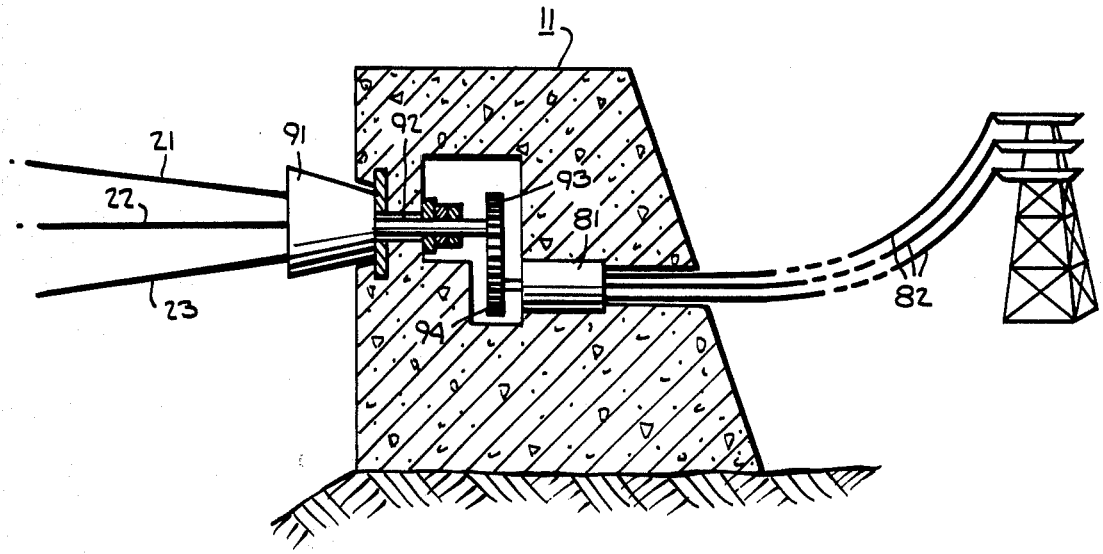
FIG. 4 is a partial sectional view of a power takeoff in a pier.

In FIG. 4, cables 21, 22 and 23 are attached to and rotate cone 91 and attached shaft 92. Shaft 92 in turn rotates gear 93 coupled to gear 94, thus driving alternator 81. The electrical current from alternator 81 is fed to the power grid by conductors 82. Generally, the distance between the axis of cone 91 and the attachment points of cables 21, 22, and 23 should be substantial so that the torque acting upon the cables will not twist them about one another. A greater angle between the axis of cone 91 and cables 21, 22, and 23 also helps to avoid twisting.

FIG. 2 shows a hydrodynamic embodiment of the present invention which utilizes the flow of water in, say, a river to impinge upon hydrofoils 241 carried on tension members 221, 222, 223, and 224 which span the distance between support members 211 and 212. The angle of attack of hydrofoils 241 is controlled by vanes 242. Rotating members 231, 232, 233, and 234 are tores having neutral or positive buoyancy to reduce the sag in tension members 221, 222, 223, and 224, but which do not permit the foils to rise above the surface of the water. Rotating member 234 has drive means adapted to couple with a power takeoff mounted on barge 213 held in position by trunnions (not shown) connected by bearings to ring 234. The sags in the apparatus and the tensions in cables 221, 222, 223 and 224 are based on the same considerations as discussed in connection with the aerodynamic apparatus of FIG. 1, except that the material from which the foils are constructed can itself be buoyant so that little or no buoyancy need be contributed by tores 231, 232, 233, and 234.

FIG. 3 shows an alternative construction for a barge—or shipborne power takeoff for a hydrodynamic embodiment of this invention. Cables 231, 232, 233, and 234 are terminated at cone 291 fixed to shaft 292 which penetrates vessel hull 293. According to standard marine propulsion practice, shaft 292 runs in bearing 294 held in gland 295, the inboard end of which is filled with packing 296.

Gland 295 is provided with lantern ring holes 297 for lubrication. The packing is held in place with ring 298. The inboard end of shaft 292 passes into transmission 299 having appropriate thrust bearings (not shown).

The output from the transmission is coupled to appropriate rotary equipment for generating electrical power or other useful machinery. The transmission output could for example be attached to a pump which would raise water to a higher level, whereafter its potential energy can be used to drive a turbine and thereby furnish power for peak-shaving or for times when the wind velocity is low or nil.

The transmission can if desired provide a right-angle drive. This is desirable in some embodiments, since the shaft can penetrate the side of the barge or other vessel, and it is sometimes convenient to arrange the generating equipment or other mechanical equipment in a fore-and-aft orientation. In an embodiment where the power takeoff vessel is anchored in relatively deep water, it is possible to use the packing, bearings, shafting, and other mechanical appliances of a vessel which is no longer economical for use in transportation. Thus, a Liberty ship could be fitted out as a power takeoff for hydrodynamic embodiments of the invention.

In the FIG. 2 embodiment, the same general considerations apply as in the apparatus of FIG. 1. The foils are suitably modified to operate efficiently in the liquid medium. The power takeoff can be in association with support means 211 instead of on barge 213, in which latter instance, tore 234 can be identical to the other rotating members.

Figure 5:
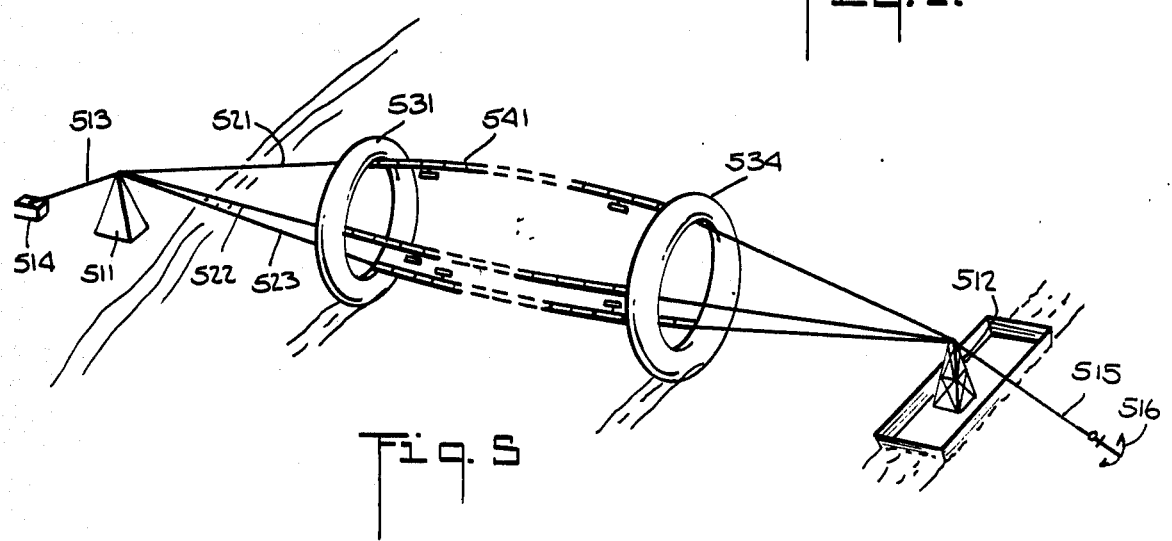
FIG. 5 is a schematic isometric view of a smaller scale embodiment.

FIG. 5 is illustrative on a small scale of an embodiment which is particularly useful for harnessing the energy in the wind and which can be moved to take advantage of the prevailing direction of the wind or to supply power at or close to the point where it is required.

In the FIG. 5 embodiment, cables 521, 522, and 523 bearing airfoils 541 are carried between support means 511 and 512. Support 511 is stabilized by cable 513 anchored ashore by deadman 514. Support 512 is carried on barge 517 and is stabilized by cable 515 attached to anchor 516. Rotating members 531 and 534 (the only two shown of the nine used) again carry the foils above water level.

It may be desirable in some embodiments of the invention to utilize an entirely waterborne aerodynamic version. In such an embodiment, barge 512 and its associated equipment would be duplicated and used instead of tower 511 and its associated gear. In such an instance, electrical generating equipment could be on one or both vessels.

The adaptability and portability of the FIG. 5 embodiment is further enhanced by the construction shown in FIG. 10. In this embodiment air foil sections are carried on cable 521 and support and shape integument 542. The integument can be any flexible material such as polyurethane- or chloroprene-coated nylon or polyester or a polyolefin or other flexible material. The use of tubular extruded polyethylene has been found to be particularly advantageous. Utilizing this embodiment, a very economical construction is obtained and at the same time it is readily stowed for movement to and erection at another location.

It is also possible to utilize integument 542 as the tension member or as part of the tension member in the FIG. 10 embodiment, and cable 521 would then be eliminated or could be reduced in size. Such an embodiment utilizes a high-tensile strength sheeting, such as Kevlar high-strength plastic film.

Apparatus such as this is, for example, composed of nine tores spanning a distance of 200 meters.

FIG. 10 also shows control slat 543 attached to foil 541A and its adjacent foil by means of booms 544. The foils in one embodiment are 2.5 cm wide with a chord of 19.5 cm and a thickness/chord ratio of 12 percent. The spacing between adjacent aerofoils is 60 cm. With a two-meter diameter for the tension members and a 200 m length, the power produced is about 60 kw in an 8 m/sec wind.

FIGS. 6, 7, and 8 illustrate forms of apparatus which are particularly adapted for aerodynamic use. In each of these three schematic drawings, the air foils are omitted. In FIG. 6, the embodiment is useful for areas where the wind occurs in two major directions. Cables 621, 622, 623 and 624 are installed between support means 611 and 612 and cables 625, 626, and 627 carried by rotating members 635, 636, 637, and 638 spanning support members 612 and 613. Member 611 is ashore and support members 612 and 613 are piers in the bed of the body of water. In certain embodiments pier 612 is replaced by a barge.

FIGS. 7 and 8 illustrate two omnidirectional systems. No matter what direction the wind is from, at least one of the arrays of cables will rotate. FIG. 7 shows a delta arrangement wherein piers 711 and 712 support cables 721, 722, and 723 carried by rotating members 731, 732, and 733; piers 712 and 713 support cables 724, 725 and 726 carried by rotating members 734, 735, 736 and 737; and piers 711 and 713 support cables 727, 728, and 729 carrying rotating members 738, 739 and 740. FIG. 8 shows a wye configuration wherein piers 811, 812, 813 and 814 carry cables 821, 822, 823, 824, 825, 826, 827, 828, and 829 carried by rotating members 831, 832, 833, 834, 835, and 836.

If it is desired to carry a lesser tension in the tension members, a phasing member can be added across the span between the rotating members, as illustrated by cables 71, 72, and 73 in FIG. 1. These phasing members are connected to points on adjacent rotating members 31 and 32, for instance, so that the points of attachment are less than 180° apart with reference to center of rotation 35. In the FIG. 1 embodiment three inter-span phasing members are shown attached to each rotating member to reduce the helical twist arising from the fact that each succeeding rotating member drives the more inshore one and is driven by the more offshore one.

The number of phasing members shown in FIG. 1 is three for each span, but one, two, or some greater plurality can be used. In general, the minimum number of phasing members is preferred so as to minimize the windage of the apparatus, reduce its weight and cost, and simplify its construction.

The phasing members can in certain preferred embodiments of the invention be attached so they they limit the phase angle between two circular members up to about 15° to 30°, depending upon the span lengths between circular members, the total span length, the supports, the allowable tensile loads in the tension members, and like factors. It can be helpful during startup of systems, especially the portable systems exemplified by FIG. 5, to use the phasing members to assure orderly rotation. They are also useful in preventing the circular members from toppling sideways and in assisting their orientation during startup.

The circular members should be able to rotate as freely as possible. In the aerodynamic embodiments when the circular members provide flotation, their rotating resistance will be influenced to some extent by the sea state, there being more wetted surface resistance when a larger portion of the bottom is immersed in the crest of a wave. The resistance to rotation will of course also be influenced by the surface of the circular members. In both hydrodynamic and aerodynamic configurations, an anti-fouling surface is desirable. This can be accomplished by use of appropriate anti-fouling surface coatings such as those containing copper compounds, tributyl tin oxide, and the like or by selection of materials of construction such as copper-clad steel and the like.

The presently preferred modes are described in this specification, and it will be understood that such embodiments are given to illustrate the invention. The invention is accordingly not to be considered as restricted thereto except as indicated in the present claims.

What is claimed is:

1. An apparatus for withdrawing useful energy from a fluent medium, the apparatus comprising
   at least two spaced-apart supports;
   a plurality of tension members spanning the distance between the supports;
   foil members attached to the tension members over at least a portion of the span of the tension member, the foils being adapted to generate lift in response to the flow of the medium relative to the foils and thereby to cause tension members to rotate about a common center of rotation substantially parallel to the tension members;
   circular members attached to the tension members, which circular members are capable of rotating about the rotation center and maintaining the spacing of the tension members from the center of rotation, at least one of the circular members rotating freely; and
   power takeoff means.

2. Apparatus according to claim 1 wherein the freely rotating circular members are toroids.

3. Apparatus according to claim 1 wherein the freely rotating circular members are supported by buoyant forces.

4. Apparatus according to claim 3 wherein the circular members are adapted to be immersed in a liquid and having a buoyant force sufficient to maintain the foils immersed in the liquid throughout rotation of the tension members about the center of rotation.

5. Apparatus according to claim 3 wherein the circular members are adapted to float on a liquid and having a buoyant force sufficient to maintain the foils above the liquid throughout the rotation of the tension members about the center of rotation.

6. Apparatus according to claim 1 wherein the circular members are circular tores.

7. Apparatus according to claim 1 wherein a phasing member extends across the space between each circular member and its adjacent circular member, the point of attachment of the phasing member between the two circular members being less than 180° with respect to the center of rotation.

8. Apparatus according to claim 7 wherein the phasing members are cables.

9. Apparatus according to claim 7 wherein the phasing members are attached to the circular members so that the phase angle is up to about 30°.

10. Apparatus according to claim 1 wherein the tension members are cables.

11. Apparatus according to claim 1 wherein the tension members are chains.

12. Apparatus according to claim 1 wherein the tension members comprise rods.

13. Apparatus according to claim 1 wherein the foil members encompass the tension members.

14. Apparatus according to claim 1 wherein there are at least three tension members attaching each circular member to its next adjacent circular member.

15. Apparatus according to claim 1 wherein there are four tension members attaching each circular member to its next adjacent circular member.

16. An apparatus according to claim 1 wherein there is a single power takeoff circular member immediately adjacent to a support.

17. Apparatus according to claim 1 wherein a power takeoff is provided at at least one support.

18. Apparatus according to claim 1 wherein the foils are moved by adjusting means to maintain an optimum lift/drag ratio.

19. Apparatus according to claim 1 wherein the foils are moved by adjusting means to maintain cable loads within a selected tensile stress range.

20. Apparatus according to claim 1 wherein the foils comprise thin sheets maintained in the desired foil shape by foil sections spread apart on the tension members.

21. Apparatus according to claim 1 having at least two circular members between which is a support member adapted to reduce the curvature of the line defining the centers of rotation of the tension members.

22. Apparatus according to claim 1 wherein there are a plurality of spans oriented for fluent medium flow from at least two different azimuths.

23. Apparatus according to claim 22 wherein there are three spans in a delta configuration.

24. Apparatus according to claim 22 wherein there are three spans in a wye configuration.

* * * * *